Aug. 16, 1966  F. LORENZ ET AL  3,266,927
PROCESS FOR THE AFTERTREATMENT OF POLYURETHANE FOAM
Filed July 3, 1962

INVENTORS
FRITZ LORENZ AND
GUNTHER SCHLAGENHOF
BY:
Harold H. Jenkins

United States Patent Office 3,266,927
Patented August 16, 1966

3,266,927
PROCESS FOR THE AFTERTREATMENT OF
POLYURETHANE FOAM
Fritz Lorenz and Gunther Schlagenhof, Wattwil, St. Gall, Switzerland, assignors to Scott Paper Company, Philadelphia, Pa., a corporation of Pennsylvania
Filed July 3, 1962, Ser. No. 207,323
5 Claims. (Cl. 117—98)

The present invention relates to flexible polyurethane foams and more particularly to the treatment of such foams whereby improvements in the physical characteristics, as for example, the softness thereof are obtained.

Polyurethane foams are well known commercial products of varied utility and it is customary to modify their structure as required for their intended uses. Polyurethane foams are generally prepared from polyester resins and organic isocyanates in the presence or absence of water and activators. The polyesters are obtained by the reaction of polyhydric alcohols and polybasics, preferably dicarboxylic acids, such as adipic, sebacic and similar acids. Reaction control permits considerable variation in the pore size of the foamed product and also the extent of open or communicating cells in the porous structure. A known process involves modification and softening of polyurethane foams by an aftertreatment with alkali or acid baths, and particularly with caustic alkali solutions. However, a disadvantage of this process is the lack of control thereof and the irregular products resulting from its use.

A method has now been found which permits an accurate control over the modification of polyurethane foams with caustic alkali solutions and the production of a uniform, air-permeable and soft foam. Briefly, the present invention contemplates a process for the aftertreatment of flexible polyurethane foam sheeting by means of caustic alkali solutions wherein a flat web of foam sheeting is wound into a multi-layered roll upon a perforated drum, which is disposed for rotation about its longitudinal axis, and while the drum is being rotated, the foam is subjected to the action of a caustic alkali solution. Subsequently, in order to remove the alkali solution from the foam, the speed of rotation of the drum is increased to expel radially the alkali solution from the layers of foam and also water introduced centrally of the drum through the shaft upon which it is supported is forced outwardly in a radial direction through the drum and the layers of foam to assist in displacement of the alkali solution therefrom.

The present invention also relates to apparatus for performing the described process including an impregnating device, a perforated drum, disposed upon a perforated hollow shaft through which it is motor driven to rotate about its horizontal axis, and through which it is supplied optionally with caustic alkali solution or water.

In accordance with the invention, caustic alkali solution, and especially caustic soda of from 8–30° Baumé is used for treatment of the polyurethane foam. The web of foam may be impregnated with the caustic alkali solution in the flat state, if desired passed between wringer rolls to insure uniform distribution of the alkali solution through the foam sheeting before it is wound upon the drum. Alternately, the foam sheeting may be wound upon the drum in dry state and the caustic alkali solution introduced into the interior of the drum can be forced outwardly through the wound up layers of the foam sheeting by rotation of the drum. To force the caustic alkali solution through the several layers of foam the drum is rotated at speeds between 100 and 200 revolutions per minute. The caustic alkali solution is able to act at room temperatures, that is, between 15 and 25° C. in which case the drum is rotated slowly at speeds of from 15 to 20 revolutions per minute and the action time of the alkali solution is from 1 to 2 hours. However, the reactivity of the caustic alkali solution is increased at temperatures between 60 and 80° C. and generally at these higher temperatures, a shorter reaction time is found to be sufficient.

A diagrammatic example of apparatus suitable for conducting the process of this invention is shown in the accompanying drawing, wherein.

Figure 1:
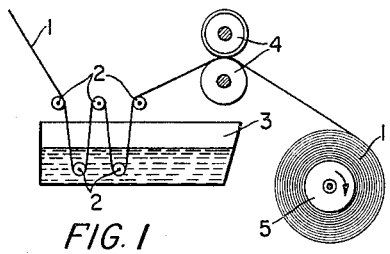
FIGURE 1 is a side elevation, partially in cross-section of one form of foam impregnating equipment.

As shown in FIGURE 1, one form of foam impregnating apparatus includes a trough or tank 3, in the lower part of which are disposed in spaced parallel relation two rotatable rollers 2 and above which are disposed in spaced parallel relation additional rollers 2, the arrangement of rollers serving to advance a web 1 of polyurethane foam through a caustic alkali solution within the trough 3. After the polyurethane foam is impregnated with treating solution, it is led through pair of wringer rolls 4, suitably mounted above the trough 3 at one end thereof and finally is wound upon a perforated drum 5 as a multi-layered roll. The drum 5, which suitably has a diameter of approximately 50 centimeters, is carried upon a perforated hollow shaft 6.

Figure 2:
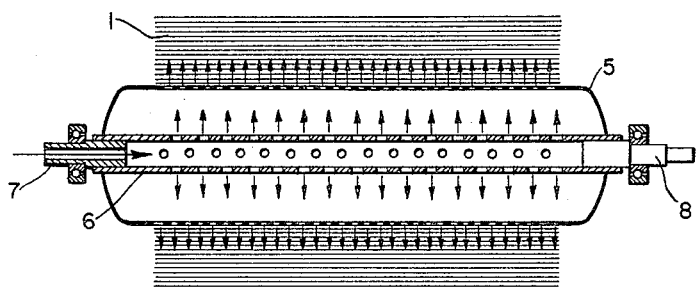
FIGURE 2 is a vertical sectional view of the supporting drum wound with foam sheeting and FIGURES 3 and 4 are perspective views of the apparatus as adapted for the aftertreatment of foam with caustic alkali solution as well as for removal of such solutions.
Figure 3:
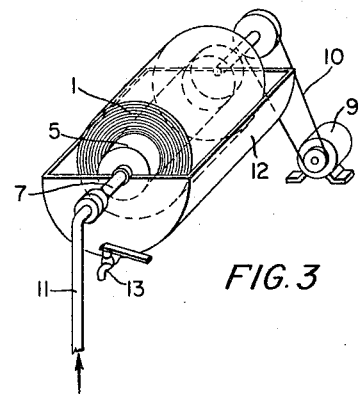
Figure 4:
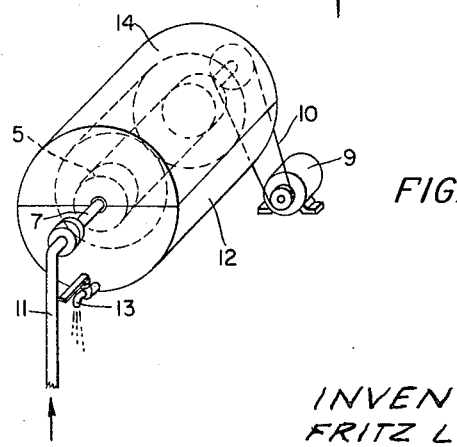

As can be seen in FIGURE 2, one end of the shaft 6 is provided with a hollow journal 7, which is connected to feed pipe 11 for the supply of caustic alkali solution or water. The other end of the shaft 6 is provided with a journal 8 which is fitted with a drive shaft, whereby the shaft, as best seen in FIGURES 3 and 4, is driven by the electric motor 9 through a chain drive 10. The drum 5 is disposed within a closed housing consisting of a trough 12 and a removable cover 14, from which the spent treating liquor may be removed through a valve 13.

The inventive concept is illustrated in the following examples.

Example 1

A web of polyester polyurethane foam of about 3 mm. thickness is impregnated in the flat state with caustic soda solution of 18–30° Baumé in the apparatus shown in FIGURE 1 under minimum tension and passed through the wringer rolls leaving a 60% pick up of treating solution. It is essential that uniform impregnation be effected in order that non-uniformity of treatment of the foam sheeting will be avoided. The foam web is then wound up evenly upon the perforated drum shown in FIGURE 2 and the loaded drum is slowly rotated at about 20 revolutions per minute for from 90 to 120 minutes at room temperatures of about 15 to 20° C. to allow the caustic soda solution to act upon the polyurethane foam. Subsequently, the treating process is halted. The treating solution is removed by rotating rapidly the perforated drum and feeding water into it, which through centrifugal force flows through all of the layers of the foam web to the outer surface and is expelled therefrom.

As polyurethane foam is an elastic material which may expand or stretch under this centrifuging and eventually will tear, it is preferred to interleave a thin textile fabric, suitably of synthetic material, with the foam sheeting so that the individual foam layers will be supported by the covering fabric.

After the treating solution has been removed from the foam, requiring about 30 minutes at a rotational speed of about 120 revolutions per minute, the drum rotation is increased to between 140 and 200 revolutions per minute to remove the remaining water from the foam. Subsequently, the layers of foam may be dried by any convenient method. There is obtained a uniformly-modified, air-permeable soft foam web exhibiting a weight reduction of from 30 to 40% of that of the starting material.

*Example II*

A polyurethane foam web is impregnated with caustic soda solution as described in Example I, wrung out and reeled upon the perforated drum 5. The loaded drum is slowly rotated at about 20 revolutions per minute and at the same time air heated to about 70° C. is introduced into the housing 12. The caustic soda solution is allowed to act upon the foam for about 30 minutes after which the extraction of spent treating liquor and drying are effected as in Example I. Again, a uniformly-modified, soft foam web is obtained.

*Example III*

A web of polyurethane foam is wound upon the perforated cylinder 5 in a dry condition and the cylinder is rotated at about 150 revolutions per minute. Caustic soda solution of 10° Baumé is pumped into the interior of the drum for about 5 minutes and is forced outwardly through the foam sheeting. Thereafter the drum is rotated at a speed of 20 revolutions per minute to maintain the solution within the foam for reaction therewith over a period of about 90 minutes. Subsequently removal of the spent treating solution and drying is effected as set out in Example I. A uniformly-modified foam web, exhibiting a weight loss of about 20 to 30% compared to the starting material, is obtained.

What is claimed is:

1. A process of treating flexible polyurethane foam sheeting with caustic alkali solution which comprises winding said foam sheeting into a multi-layered roll having a generally horizontal axis, impregnating the polyurethane foam sheeting with a caustic alkali solution, rotating slowly the roll of impregnated foam sheeting to maintain said alkali solution within the foam sheeting for a time sufficient for chemical reaction therewith, and subsequently increasing the speed of rotation of the rolled foam sheeting to expel radially therefrom the caustic alkali solution.

2. A process as defined in claim 1 in which the caustic alkali solution is caustic soda at a concentration of from 8–30° Baumé, the time of exposure for reaction thereof with the polyurethane foam sheeting is from about 30 minutes to 120 minutes and the reaction temperature is maintained between 15 and 25° C.

3. A process of treating flexible polyurethane foam sheeting with caustic alkali solution which comprises winding said foam sheeting into a multi-layered roll having a generally horizontal axis, impregnating the polyurethane foam sheeting with caustic soda solution at a concentration of from 15–20° Baumé, rotating the roll of impregnated foam sheeting at a speed of about 15–20 revolutions per minute to maintain said solution within the foam sheeting for reaction therewith, subsequently increasing the speed of rotation of the rolled foam sheeting to between 100 and 200 revolutions per minute to expel radially therefrom the caustic soda solution and introducing water centrally of the rolled foam sheeting to assist in displacement of the caustic soda solution therefrom during such accelerated rotation.

4. A process of treating flexible polyurethane foam sheeting with caustic soda solution as defined in claim 3 in which the time of exposure for chemical reaction between the caustic solution and the foam is less than 30 minutes and the reaction temperature is maintained between 60 and 80° C.

5. A process of treating flexible polyurethane foam sheeting with caustic alkali solution which comprises winding said foam sheeting into a multi-layered roll with a web of fabric interleaved with the layers of foam sheeting, impregnating the foam sheeting with a caustic alkali solution, maintaining said solution within the foam sheeting for a time sufficient for chemical reaction therewith, and thereafter rotating the roll of foam sheeting and fabric to expel radially therefrom the alkali solution, said fabric web limiting stretching of the foam sheeting during rotation of the roll for expulsion of the alkali solution.

References Cited by the Examiner

UNITED STATES PATENTS

| | | | |
|---|---|---|---|
| 1,280,187 | 11/1918 | Dudley | 68—150 |
| 1,907,667 | 5/1933 | Richter et al. | 68—150 XR |
| 1,981,453 | 11/1934 | Hyde | 117—101 |
| 2,028,782 | 1/1936 | Jackson | 117—113 XR |
| 2,054,155 | 9/1936 | Dalken | 117—101 |
| 2,087,965 | 7/1937 | Cherrington | 117—101 |
| 2,498,416 | 2/1950 | Hadley | 68—150 XR |
| 2,771,379 | 11/1956 | Di Dario | 117—113 XR |
| 2,900,278 | 8/1959 | Powers et al. | 117—98 |
| 3,013,924 | 12/1961 | Taft et al. | 264—48 XR |

WILLIAM D. MARTIN, *Primary Examiner.*

JOSEPH REBOLD, A. R. NAVARO, Jr., T. G. DAVIS, *Assistant Examiners.*